US011258774B1

(12) United States Patent
Chaubey (10) Patent No.: US 11,258,774 B1
(45) Date of Patent: Feb. 22, 2022

(54) ADAPTIVE CONTROL OF SECURE SOCKETS LAYER PROXY

(71) Applicant: Juniper Networks, Inc., Sunnyvale, CA (US)

(72) Inventor: Rajeev Chaubey, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/001,146

(22) Filed: Aug. 24, 2020

(51) Int. Cl.
*H04L 29/06* (2006.01)
*H04L 9/08* (2006.01)
*G06F 21/60* (2013.01)

(52) U.S. Cl.
CPC ........ *H04L 63/0485* (2013.01); *G06F 21/602* (2013.01); *H04L 9/0891* (2013.01); *H04L 63/166* (2013.01)

(58) Field of Classification Search
CPC . H04L 63/0485; H04L 63/166; H04L 9/0891; G06F 21/602
See application file for complete search history.

(56) References Cited

U.S. PATENT DOCUMENTS

| | | | |
|---|---|---|---|
| 8,838,958 B2 | 9/2014 | Suganthi et al. | |
| 2004/0250059 A1* | 12/2004 | Ramelson | H04L 63/0428 713/150 |
| 2014/0195797 A1* | 7/2014 | du Toit | H04L 63/0428 713/152 |
| 2014/0337614 A1* | 11/2014 | Kelson | H04L 63/20 713/152 |
| 2019/0190891 A1 | 6/2019 | Pillai et al. | |
| 2020/0236140 A1* | 7/2020 | Srinivasan | H04L 63/166 |
| 2020/0259863 A1* | 8/2020 | Lee | H04L 67/141 |

OTHER PUBLICATIONS

Sun et al., "Defending against low-rate TCP attacks: dynamic detection and protection", Proceedings of the 12th IEEE International Conference on Network Protocols, Date of Conference: Oct. 8-8 (Year: 2004).*
Extended European Search Report for Application No. EP20201392.6, dated Mar. 3, 2021, 7 pages.

* cited by examiner

*Primary Examiner* — Morshed Mehedi
(74) *Attorney, Agent, or Firm* — Harrity & Harrity, LLP (57) ABSTRACT

A network device may decrypt a record received from a source device and associated with an encrypted session. The network device may process the decrypted record. The network device may encrypt the record to generate an encrypted payload. The network device may store an entry in a retransmission mapping that includes a decryption key used to decrypt the record and an encryption key used to encrypt the record. The network device may transmit the encrypted payload in a first TCP packet toward the destination device. The network device may receive retransmitted data and may determine, based on the record entry, that the retransmitted data is associated with the record. The network device may decrypt, using the decryption key, the retransmitted data and may re-encrypt, using the encryption key, the decrypted record. The network device may transmit, toward the destination device, the encrypted payload in a second TCP packet.

20 Claims, 6 Drawing Sheets

ADAPTIVE CONTROL OF SECURE SOCKETS LAYER PROXY

BACKGROUND

A cryptographic protocol, such as secure sockets layer (SSL) protocol, transport layer security (TLS) protocol, and/or the like, may be used to securely transmit data over a computer network. The cryptographic protocol may be an application-level protocol that provides encryption technology for transmitted data. For example, TLS/SSL may utilize certificates and private-public key exchange pairs to enable the secure transmission of data between a client device and a server device.

SUMMARY

In some implementations, a method includes decrypting, by a network device, a record received from a source device to form a decrypted record, wherein the record is associated with an encrypted session between the source device and a destination device; processing, by the network device, the decrypted record in association with securing the encrypted session; encrypting, by the network device, the decrypted record to generate an encrypted record payload; storing, by the network device and based on the encrypted record payload being generated, a record entry in a retransmission mapping, wherein the record entry includes a decryption key used to decrypt the record and an encryption key used to encrypt the decrypted record; transmitting, by the network device, the encrypted record payload in one or more first transmission control protocol (TCP) packets toward the destination device; receiving, by the network device, retransmitted data; determining, by the network device and based on the record entry, that the retransmitted data is associated with the record; decrypting, by the network device and using the decryption key, the retransmitted data to regenerate the decrypted record; re-encrypting, by the network device and using the encryption key, the regenerated decrypted record to regenerate the encrypted record payload; and transmitting, by the network device and toward the destination device, the regenerated encrypted record payload in one or more second TCP packets.

In some implementations, a network device includes one or more memories; and one or more processors to: receive a record of an encrypted session between a source device and a destination device; store, in a retransmission mapping, a record entry associated with processing the record in association with the encrypted session and transmitting an encrypted record payload associated with the record, wherein the record entry includes a decryption key to be used to decrypt the record for an inspection and an encryption key to be used to encrypt the decrypted record to generate the encrypted record payload; transmit the encrypted record payload in one or more first transmission control protocol (TCP) packets toward the destination device; receive retransmitted data; determine, based on the record entry, that the retransmitted data is associated with the record; decrypt, using the decryption key, the retransmitted data to regenerate the decrypted record; re-encrypt, using the encryption key, the regenerated decrypted record to regenerate the encrypted record payload; and transmit, toward the destination device, the regenerated encrypted record payload in one or more second TCP packets.

In some implementations, a non-transitory computer-readable medium storing a set of instructions includes one or more instructions that, when executed by one or more processors of a network device, cause the network device to: receive retransmitted data associated with a record that was previously processed using a decryption key and an encryption key in association with an encrypted session that uses transport layer security protocol; access a retransmission mapping to identify a record entry associated with the record being previously processed; determine, based on the record entry, that the retransmitted data is associated with the record; decrypt, using the decryption key, the retransmitted data to regenerate a decrypted record that was previously generated when the record was previously processed; re-encrypt, using the encryption key, the regenerated decrypted record to regenerate an encrypted record payload that was previously generated when the record was previously processed; and transmit, toward a destination device, the regenerated encrypted record payload in one or more transmission control protocol (TCP) packets.

DETAILED DESCRIPTION

The following detailed description of example implementations refers to the accompanying drawings. The same reference numbers in different drawings may identify the same or similar elements.

In some cases, a network device needs to inspect TLS/SSL traffic to enforce a security policy. For example, the network device may need to inspect TLS/SSL traffic transmitted between a client device and a server device via a communication session. They network device may not be able to inspect the encrypted TLS/SSL traffic (or certain modes of handshakes, such as a Diffie Hellman key exchange with forward secrecy, a TLS 1.3 handshake, and/or the like) because the cryptographic keys utilized to encrypt the TLS/SSL traffic are not known by the network device.

To inspect the TLS/SSL traffic, the network device may act as man in middle and break the connection between the client device and the server device into two parts: client to network device and network device to server device. The network device may perform two TLS handshakes, a first handshake with the client device and a second handshake with the server device. The parameters and cryptographic keys generated for these handshakes may be different. After performing the two TLS handshakes, the network device is in possession of cryptographic keys needed to encrypt and decrypt client traffic as well as server traffic for that communication session.

As an example, the client device may transmit TLS/SSL traffic to the server device. The network device may receive the TLS/SSL traffic and may decrypt the TLS/SSL traffic using the cryptographic keys used to perform the first handshake. The network device may perform a security function on the decrypted TLS/SSL traffic. The network device may re-encrypt the TLS/SSL traffic using the cryptographic keys used to perform the second handshake. Thus, the network device acts as a SSL proxy between the client device and the server device. Although the decrypted TLS/SSL traffic may be the same as the TLS/SSL traffic encrypted by the client device or the server device, because the network device may re-encrypt the TLS/SSL traffic using different cryptographic keys, the encrypted payload may be different from the encrypted payload received by the network device. Therefore, the network device may need to ensure that the receiving device (e.g., the client device or the server device) receives correct data.

To ensure that the receiving device receives correct data, the network device acts as a transmission control protocol (TCP) end point for the client device and the server device and performs complete TCP functionality including storage of re-encrypted payload for retransmission and/or the like. Thus, the network device acts as TCP proxy between the client device and the server device. In some cases, it is possible to have an adaptive mode where a network device may not perform as the TCP end point beyond the TLS handshake. The network device may act as light weight TCP header read-writer working on TLS record boundaries.

When acting as the TCP end point, the network device may receive one or more TCP segments from the client device. The one or more TCP segments may include an encrypted TLS/SSL record. The network device, acting as the TCP end point, may transmit an acknowledgment to the client device based on receiving the one or more TCP segments. The network device may decrypt the encrypted TLS/SSL record, process (e.g., perform a security function) the decrypted TLS/SSL record, and re-encrypt the processed TLS/SSL record. The network device may transmit the re-encrypted TLS/SSL record to the server device via one or more TCP data segments.

In some cases, the network device may not receive an acknowledgment from the server device indicating that the server device received the one or more TCP data segments including the re-encrypted TLS/SSL record. In these cases, a TCP timeout may occur indicating that the network device is to retransmit the re-encrypted TLS/SSL record to the server device. To be able to retransmit the re-encrypted TLS/SSL record, the network device may store a copy of the re-encrypted TLS/SSL record (e.g., as one or more TCP segments in a retransmission queue for that particular TCP connection).

Commonly, when acting as a TCP end point, the network device may receive hundreds, thousands, tens of thousands, or even hundreds of thousands of encrypted TLS/SSL records on thousands of TCP connections. The network device may decrypt, process, and re-encrypt each of the encrypted TLS/SSL records thereby resulting in the network device storing copies of hundreds, thousands, tens of thousands, or even hundreds of thousands of copies of re-encrypted TLS/SSL records. Storing the copies of the re-encrypted TLS/SSL records may require the network device to utilize large amounts of computing resources (e.g., processing resources, memory resources, communication resources, and/or the like). Further, a capacity of the network device may be limited by an amount of memory available to store copies of re-encrypted TLS/SSL records.

Some implementations described herein may relate to a network device that re-encrypts retransmitted data based on receiving the retransmitted data. For example, the network device may decrypt first encrypted data included in a TCP packet received from a source device (e.g., a client device). The network device may process the decrypted data (e.g., to identify any security issues associated with the data) and may encrypt the decrypted data to generate second encrypted data. The network device may store an entry in a data structure (e.g., a database, a table, a list, and/or the like) based on generating the second encrypted data. The entry may include information identifying the first encrypted data, information identifying the second encrypted data, a decryption key used to decrypt the first encrypted data, an encryption key used to encrypt the decrypted data, information identifying a starting value of a TCP sequence associated with the first encrypted data, information identifying a starting value of a TCP sequence associated with the second encrypted data, information identifying a record length associated with the first encrypted data, information identifying a record length associated with the second encrypted data, and/or the like. The network device may insert the second encrypted data in the TCP packet and may forward the TCP packet towards a destination device (e.g., a server device) associated with the TCP packet.

The network device may receive another TCP packet that includes retransmitted data corresponding to the first encrypted data. The network device may determine that the retransmitted data corresponds to the first encrypted data based on information identifying the first encrypted data included in the entry. The network device may utilize the decryption key included in the entry to decrypt the retransmitted data. The network device may utilize the encryption key included in the entry to encrypt the decrypted retransmitted data to regenerate the second encrypted data. The network device may insert the second encrypted data in the other TCP packet and may forward the other TCP packet towards the source device.

In this way, the network device may account for retransmitted data without having to store a copy of the encrypted data. By not having to store a copy of the encrypted data, the network device may conserve computing resources that otherwise would have been utilized to store the encrypted data. Further, a capacity of the network device to perform SSL proxying may be increased without having to increase a memory of the network device.

Figure 1A:
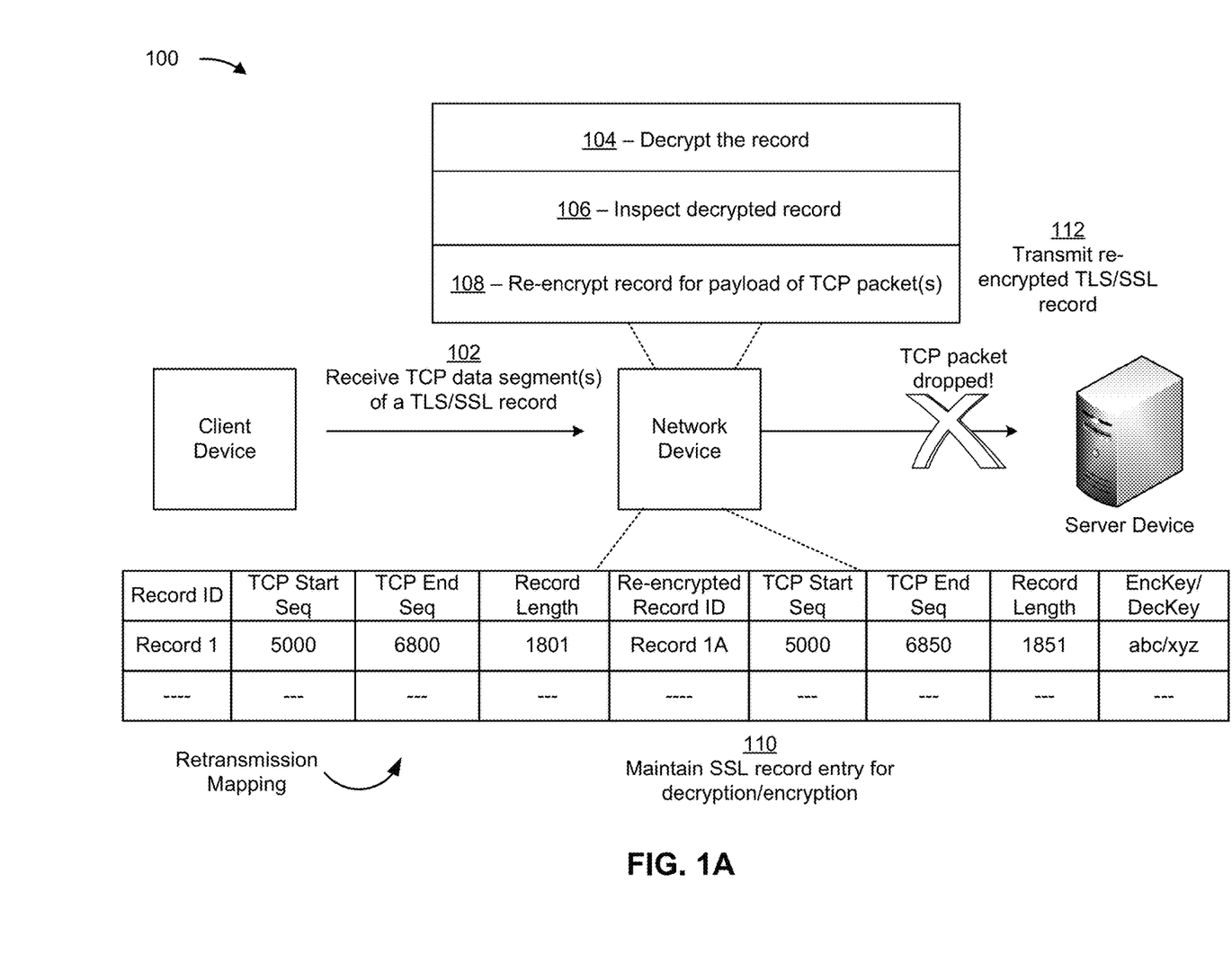
FIGS. 1A-1B are diagrams of an example implementation described herein.
Figure 1B:
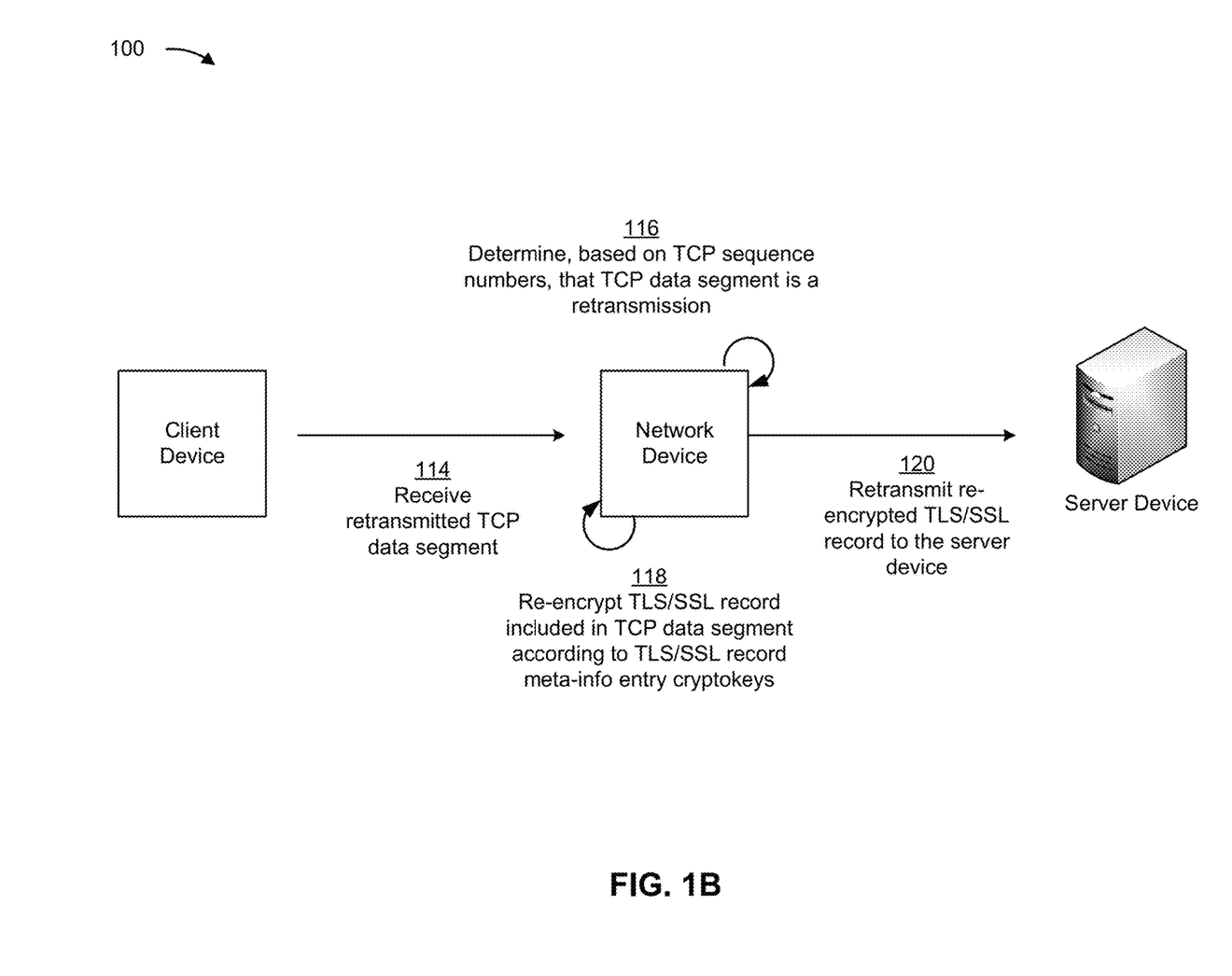

FIGS. 1A-1B are diagrams of one or more example implementations 100 as described herein. As shown in FIGS. 1A-1B, the one or more example implementations 100 include a client device, a server device, and a network device. The client device may include one or more devices configured to receive, generate, store, process, and/or provide data to the server device and/or the network device, as described herein. For example, the client device may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, and/or the like.

The server device may include one or more devices configured to receive, generate, store, process, and/or provide data to the client device and/or the network device, as described herein. In some implementations, the server device is associated with, and/or hosts, a software application, such as a productivity suite application (e.g., a word processing application, a spreadsheet application, and/or the like), a customer relationship management application, and/or the like, such that the client device may interact with the server device to interact with the software application, to transmit and/or receive information associated with the application, and/or the like. In some implementations, the server device may be a web server that hosts web content (e.g., web pages, audio and/or video streaming services, and/or the like), a file hosting server, and/or the like, such that the client device may request content stored by the server device (e.g., an electronic file, a video, an image, and/or the like), may transmit content to the server device to be stored by the server device, and/or the like.

In some implementations, the client device and the server device may be communicatively connected via the network device. The client device and the server device may communicate in a session using the connection. In some implementations, the session may be encrypted using SSL encryption, TLS encryption, and/or the like, such that the client device and/or the server device may transmit encrypted information via the encrypted session. For example, the server device may transmit a security credential, such as a certificate, a key, and/or the like, to the client device so that the client device may authenticate the server device, and/or vice-versa.

The client device and/or the server device may transmit and/or receive encrypted information in the encrypted session. In some implementations, the client device and/or the server device may transmit and/or receive encrypted application data. For example, the client device may transmit encrypted application data via a hypertext transfer protocol secure (HTTPS) request (e.g., a GET request for a webpage, a GET request for a file, a POST request to upload a file to the server device, and/or the like), and/or the like. As another example, the server device may transmit encrypted application data via an HTTPS response (e.g., a response to an HTTPS request, from the client device, for a webpage, for a file, and/or the like), and/or the like.

In some implementations, the client device and/or the server device may transmit and/or receive additional encrypted information, such as encrypted alert data, encrypted handshake data, encrypted heartbeat data, other types of TLS information, other types of SSL information, and/or the like. For example, the client device and/or the server device may transmit and/or receive encrypted alert data associated with a cryptographic operation failure, a record inconsistency, and/or the like, may transmit and/or receive encrypted handshake data associated with renegotiating the encrypted session, may transmit and/or receive encrypted heartbeat data associated with maintaining the encrypted session between the client device and the server device (e.g., a heartbeat request packet (e.g., a request to provide a heartbeat response packet), a heartbeat response packet (e.g., a response to a heartbeat request packet), and/or the like), and/or the like.

The network device may include one or more devices configured to receive, generate, store, process, provide, and/or route information associated with adaptive control of secure sockets layer proxy, as described herein. In some implementations, the network device may function as a man-in-the-middle in the encrypted session such that the network device may decrypt the encrypted information transmitted by the client device and/or the server device. For example, the network device may store a copy of the security credential associated with the server device and/or the client device, and may use the security credential to decrypt encrypted information transmitted by the client device to the server device. As another example, the network device may be communicatively connected to a certificate authority and/or another type of security credential generating device, and the network device may use the certificate authority to generate security credentials to decrypt encrypted information transmitted by the client device and/or the server device.

The network device may be configured to decrypt all encrypted information received at the network device, may be configured to decrypt encrypted information associated with particular applications (e.g., based on a policy rule specifying that encrypted information associated with a particular type of application (e.g., a web browser, an email client, and/or the like) is to be decrypted, based on being configured to decrypt encrypted information associated with a particular application, and/or the like), may be configured to decrypt encrypted information associated with a particular source (e.g., based on a source address, such as an Internet protocol (IP) address, based on an interface identifier, such as a port identifier, and/or the like), may be configured to decrypt encrypted information associated with a particular destination (e.g., based on a destination address, based on a port identifier, and/or the like), may be configured to decrypt encrypted information associated with a particular user, and/or the like. The network device may re-encrypt the information so that the re-encrypted information may be transmitted to the intended destination of the information (e.g., the client device and/or the server device) such that the client device and server device are not aware that there is a man-in-the-middle between the client device and the server device.

As shown in FIG. 1A, and by reference number 102, the network device receives a transmission control protocol (TCP) data segment of a TLS/SSL record transmitted by the client device. For example, the network device may receive a packet that includes a header portion and a payload portion that includes the TCP data segment of the record.

The network device may receive the TCP data segment via an encrypted session between the client device and the server device. In some implementations, the server device includes an application platform and the encrypted session is an application session between the client device and the application platform. The record may include application data associated with the application session.

As shown by reference number 104, the network device decrypts the record. The network device may decrypt the record to enable the record to be processed by the network device. For example, the network device may include a security device (e.g., a firewall) and may decrypt the record to enable a deep packet inspection and/or another process for identifying a security issue to be performed on the record.

In some implementations, the network device may decrypt the record based on a public-private key exchange pair associated with the client device. In some implementations, the network device may determine the public-private key exchange pair based on a process used to establish the secure communication session. As an example, to establish the communication session, the client device may transmit information identifying a first public-private key exchange pair to the server device via the network device. The network device may receive the information identifying the first public-private key exchange pair. The network device may utilize the first public-private key exchange pair to establish a first secure communication session between the network device and the client device as part of an SSL proxy process. The network device may utilize a second, different public-private key exchange pair to establish a second secure communication session between the network device and the server device. The network device may determine the first public-private key exchange pair based on the information identifying the first public-private key exchange pair. The network device may utilize the first public-private key exchange pair to decrypt the record.

In some implementations, the network device decrypts the record based on determining that an entire portion of the record has been received. The network device may determine a TCP sequence range associated with the record. For example, the network device may determine the sequence range associated with the record based on information included in a TLS/SSL record header in the TCP payload. The TLS/SSL record header may include information indicating a length of the record.

As an example, the record may include three data segments. The sequence range may include a set of three sequence identifiers based on the record including three data segments. A first data segment may be associated with a first sequence identifier having a first value (e.g., a start sequence identifier having a value of one). A second data segment may be associated with a second sequence identifier having a second value (e.g., a middle sequence identifier having a value of two). A third data segment may be associated with a third sequence identifier having a third value (e.g., an end sequence identifier having a value of three).

The network device may determine that the network device has received the respective portion of the record associated with each sequence identifier included in the sequence range. The network device may determine that the entire portion of the record has been received based on the network device having received the respective portion of the record associated with each sequence identifier included in the sequence range. The network device may decrypt the record based on determining that the entire portion of the record has been received.

As shown by reference number 106, the network device inspects the decrypted record. In some implementations, the network device includes a security device and the network device inspects the record to determine that the record is not associated with a security issue. For example, the network device may inspect the record to determine that the record does not include malicious code, that the record is not associated with a security attack (e.g., a denial of service attack), that data included in the record does not violate a security policy associated with the server device, and/or the like.

As shown by reference number 108, the network device re-encrypts the record for a payload of a TCP packet. For example, the network device may utilize the second public-private key exchange pair associated with the secure communication session between the network device and the server device to re-encrypt the record. In some implementations, the network device re-encrypts the record based on inspecting the decrypted record. For example, the network device may re-encrypt the record based on determining that the record is not associated with a security issue.

As shown by reference number 110, the network device maintains an TLS/SSL record meta-info entry for decryption and/or encryption. The network device may maintain the TLS/SSL record meta-info entry in a retransmission mapping data structure. The retransmission data structure may include TLS/SSL record meta-info entries for records decrypted, processed, and/or encrypted by the network device.

The TLS/SSL record meta-info entry may include information identifying the record (e.g., Record 1, as shown in FIG. 1A), information identifying a start sequence identifier associated with a range of sequence identifiers associated with the record (e.g., 5000, as shown in FIG. 1A), information identifying an end sequence identifier associated with the range of sequence identifiers (e.g., 6800, as shown in FIG. 1A), information identifying a TLS/SSL record length corresponding to a length of the encrypted record (e.g., 1801, as shown in FIG. 1A), information identifying the re-encrypted TLS/SSL record (e.g., Record 1A, as shown in FIG. 1A), information identifying a start sequence identifier associated with a range of sequence identifiers associated with the re-encrypted record (e.g., 5000, as shown in FIG. 1A), information identifying an end sequence identifier associated with the range of sequence identifiers associated with the re-encrypted record (e.g., 6850, as shown in FIG. 1A), information identifying a TLS/SSL record length corresponding to a length of the re-encrypted record (e.g., 1851, as shown in FIG. 1A, information identifying the decryption key used to decrypt the encrypted record, information identifying the encryption key used to re-encrypt the decrypted record, and or the like.

In some implementations, the re-encrypted record is different from the encrypted record. For example, a length of the re-encrypted record may be different from (e.g., greater than, less than, and/or the like) a length of the encrypted record based on the TLS/SSL parameters negotiated during connection establishment with the client device being different than the TLS/SSL parameters negotiated during connection establishment with the server device. The different TLS/SSL parameters may result in different types of keys being utilized, different values of maximum record size, and/or the like thereby resulting in the length of the re-encrypted record being different from the length of the encrypted record.

As shown by reference number 112, the network device transmits the re-encrypted TLS/SSL record toward the server device. The network device may insert the re-encrypted record into a payload portion of the TCP packet based on encrypting the decrypted record and/or based on maintaining the TLS/SSL record meta-info entry. The network device may transmit the TCP packet, including the re-encrypted record, towards the server device based on inserting the re-encrypted record into the payload portion of the TCP packet.

As shown in FIG. 1A, a TCP packet including one or more portions of the re-encrypted TLS/SSL record is dropped. For example, network conditions (e.g., congestion, available bandwidth, an amount of data being transmitted to and/or from the server device, and/or the like) may cause the TCP packet to be dropped, corrupted, not received by the server device, and/or the like.

As shown in FIG. 1B, and by reference number 114, the network device receives a retransmitted TCP data segment from the client device. The client device may determine that a response associated with transmitting the TCP data segment to the server device (e.g., an acknowledgement message) is not received from the server device within a particular amount of time (e.g., a time out period determined by the TCP protocol based on an estimation of a round trip time associated with transmitting the TCP data segment to the server device and receiving an acknowledgement from the server device). The client device may retransmit the TCP data segment based on not receiving the response within the particular amount of time. Alternatively, and/or additionally, the client device may retransmit the TCP data segment based on receiving a response indicating that the TCP data segment was corrupted, that only a portion of the record was received by the server device, and/or the like.

As shown by reference number 116, the network device determines, based on TCP sequence numbers in a TCP header, that the TCP data segment is a retransmission. The network device may determine that the TCP sequence numbers included in the TCP header correspond to TCP sequence numbers stored in the retransmission mapping data structure. The network device may maintain a mapping between the TLS/SSL record and corresponding TCP sequence numbers. The network device may identify the TLS/SSL record that is being transmitted based on the mapping.

The TCP data segment may include the encrypted record that was encrypted based on the TLS/SSL parameters negotiated in the first TLS/SSL handshake between the network device and the client device. The network device may utilize the decryption key generated from the first TLS/SSL handshake to decrypt the encrypted record based on the TCP data segment being the retransmission. In some implementations, the network device validates the encrypted record (e.g., verifies that the encrypted record corresponds to the encrypted record associated with the TLS/SSL record meta-info entry) based on a size of the encrypted record included in the TCP data segment, a range of sequence identifiers associated with the encrypted record included in the TCP data segment, and/or the like. For example, network device may control retransmission by allowing TCP acknowledgement for the whole TLS/SSL record. Until the network device receives complete acknowledgement for a TLS/SSL record, the network device may keep accumulating TCP acknowledgement from the server device. This may cause any retransmission that may occur to result in retransmission of the complete TLS/SSL record which might span one or more TCP data segments. By knowing the TLS/SSL record length in the retransmitted packet and corresponding TCP sequence numbers, the network device is able to retrieve associated cryptographic data from TLS/SSL record meta-info entry. The record meta-info data may include a TLS/SSL record identifier a TLS/SSL sequence number, any initialization vectors, and/or other related data. Based on this data, the network device is able to decrypt the retransmitted TLS/SSL record and validate that the network device has sent this record earlier by means of a hash, a checksum, and/or the like. Once the verification is complete, the network device may retrieve the corresponding encryption key and related data from TLS/SSL record meta-info entry and may re-encrypt the TLS/SSL record based on the encryption keys. The network device may split the re-encrypted record into one or more TCP data segments. The network device may re-write the TCP header and/or may adjust the sequence numbers. The network device may enable the TCP header rewrite and sequence number readjust processes by storing the TCP meta-info on a per communication session basis. TCP meta-info consists of TCP parameters and options that has been negotiated as well as sequence numbers, window sizes and other TCP parameters as per TCP state machine. The network device may transmit the one or more TCP data segments to the server device.

As shown by reference number 118, the network device re-encrypts the TLS/SSL record according to the TLS/SSL record meta-info entry cryptokeys. For example, the network device may utilize the encryption key included in the TLS/SSL record meta-info entry to re-encrypt the decrypted TLS/SSL record based on determining that the TCP data segment is a retransmission and/or based on validating the encrypted record. The network device may re-encrypt the decrypted TLS/SSL record without processing the decrypted TLS/SSL record based on the TCP data segment being a retransmission (e.g., based on the network device having previously processed the record, as described above with respect to FIG. 1A). The network device may insert the re-encrypted TLS/SSL record into the payload portion of the TCP packet based on re-encrypting the decrypted TLS/SSL record.

As shown by reference number 120, the network device retransmits the re-encrypted TLS/SSL record to the server device. For example, the network device may retransmit the TCP packet, including the re-encrypted TLS/SSL record, towards the server device based on inserting the re-encrypted TLS/SSL record into the payload portion of the TCP packet. In this way, the network device may account for retransmitted TCP packets without storing a copy of the re-encrypted TLS/SSL record as TCP segments on a TCP retransmission queue for that connection thereby conserving computing resources that otherwise would have been utilized to store the copy of the re-encrypted TLS/SSL record.

In some implementations, the network device stores a copy of the re-encrypted TLS/SSL record based on a network condition. For example, the network device may determine that a retransmission rate (e.g., a quantity of retransmitted TCP data segments received during a particular period of time) satisfies a threshold retransmission rate. For example, the network device may transmit an acknowledgement to the client device based on receiving the retransmitted TCP data segment. By sending the acknowledgement to the client device, the network device may prevent further retransmissions of the TCP data segment by the client device thereby preventing further decryption and re-encryption of the TLS/SSL record. The network device may store (e.g., in a TCP retransmission queue for that connection) a copy of the re-encrypted TLS/SSL record as one or more TCP segments based on the retransmission rate satisfying the threshold retransmission rate and/or based on the network device acting as the TCP end point. In this way, the network device may conserve computing resources that otherwise would have been utilized to decrypt and/or re-encrypt a TLS/SSL record that is a retransmission during periods in which TCP packets are likely to be retransmitted (e.g., during periods in which the retransmission rate satisfies the threshold retransmission rate).

Subsequently, the network device may determine that network conditions have improved. The network device may stop acting as the TCP end point based on the improvement in the network conditions. The network device may stop storing copies of re-encrypted TLS/SSL records and may process retransmitted TCP data segments in a manner similar to that described above based on the network device not acting as the TCP end point.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
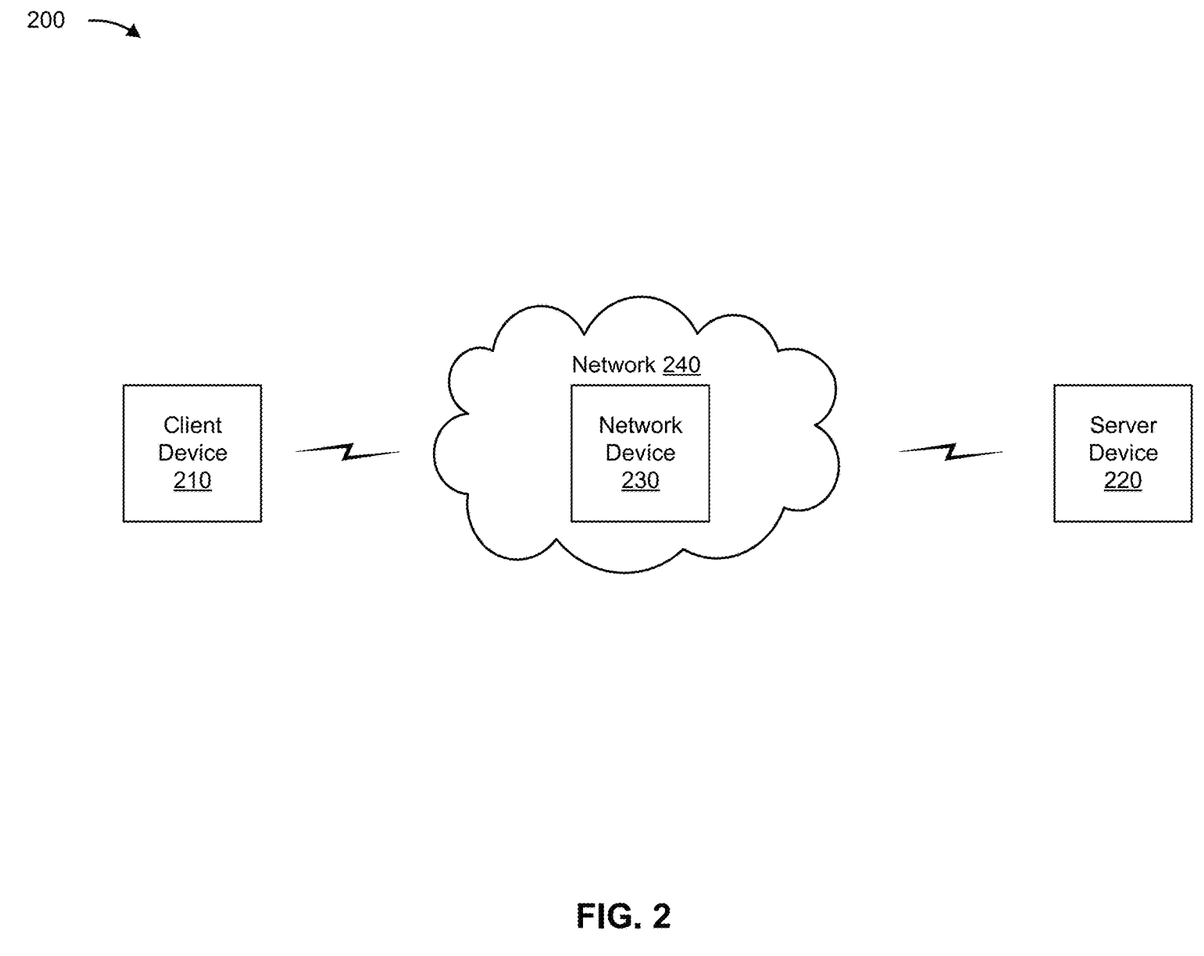
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, a network device 230, and a network 240. Devices of environment 200 may interconnect via wired connections, wireless connections, or a combination of wired and wireless connections.

Client device 210 includes one or more devices capable of receiving, generating, storing, processing, and/or providing information associated with adaptive control of secure sockets layer proxy, as described elsewhere herein. Client device 210 may include a communication device and/or a computing device. For example, client device 210 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. Client device 210 may communicate with one or more other devices of environment 200, as described elsewhere herein.

Server device 220 includes one or more devices capable of receiving, generating, storing, processing, providing, and/or routing information associated with adaptive control of secure sockets layer proxy, as described elsewhere herein. Server device 220 may include a communication device and/or a computing device. For example, server device 220 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 220 may communicate with one or more other devices of environment 200, as described elsewhere herein.

Network device 230 includes one or more devices capable of receiving, processing, storing, routing, and/or providing traffic (e.g., a packet, other information or metadata, and/or the like) in a manner described herein. For example, network device 230 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 230 may include a gateway, a switch, a firewall, a hub, a bridge, a reverse proxy, a server (e.g., a proxy server, a cloud server, a data center server, and/or the like), a load balancer, and/or a similar device. In some implementations, network device 230 may be a physical device implemented within a housing, such as a chassis. In some implementations, network device 230 may be a virtual device implemented by one or more computing devices of a cloud computing environment or a data center. In some implementations, a group of network devices 230 may be a group of data center nodes that are used to route traffic flow through a network.

Network 240 includes one or more wired and/or wireless networks. For example, network 240 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. Network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
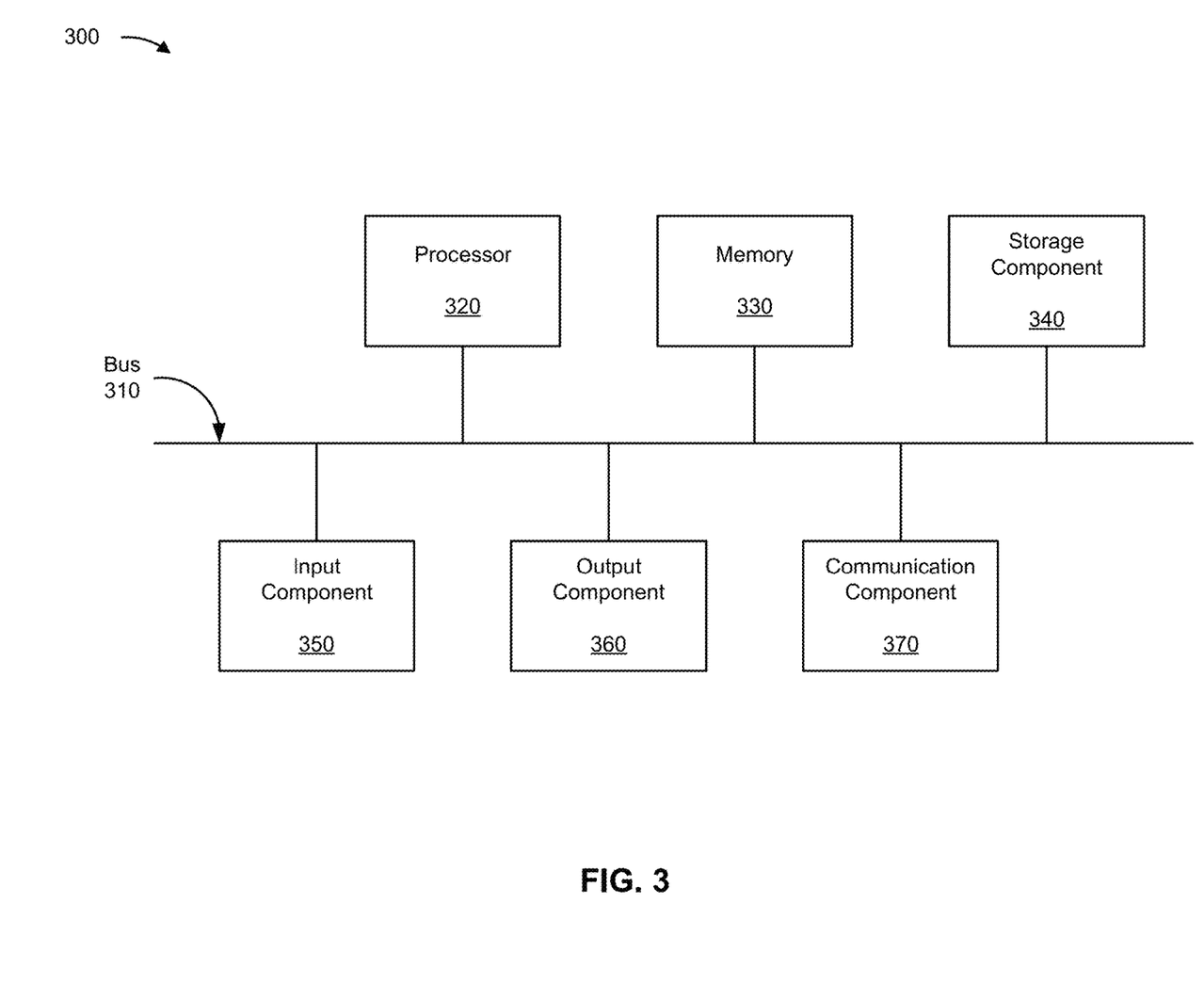
FIGS. 3 and 4 diagrams of example components of one or more devices of FIG. 2.

FIG. 3 is a diagram of example components of a device 300, which may correspond to client device 210, server device 220, and/or network device 230. In some implementations, client device 210, server device 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
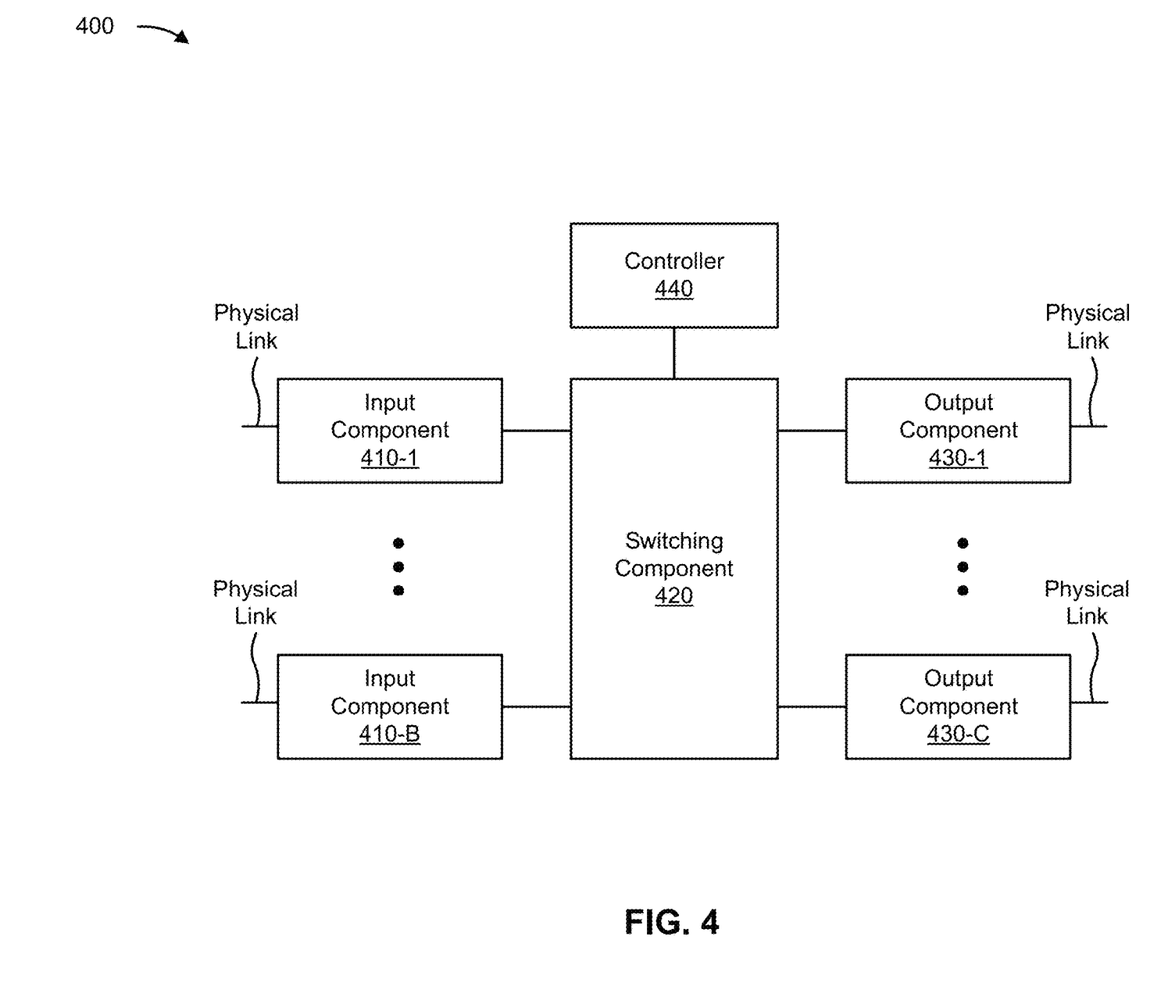

FIG. 4 is a diagram of example components of a device 400. Device 400 may correspond to server device 220, network device 230, and/or the like. In some implementations, server device 220, network device 230, and/or the like may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
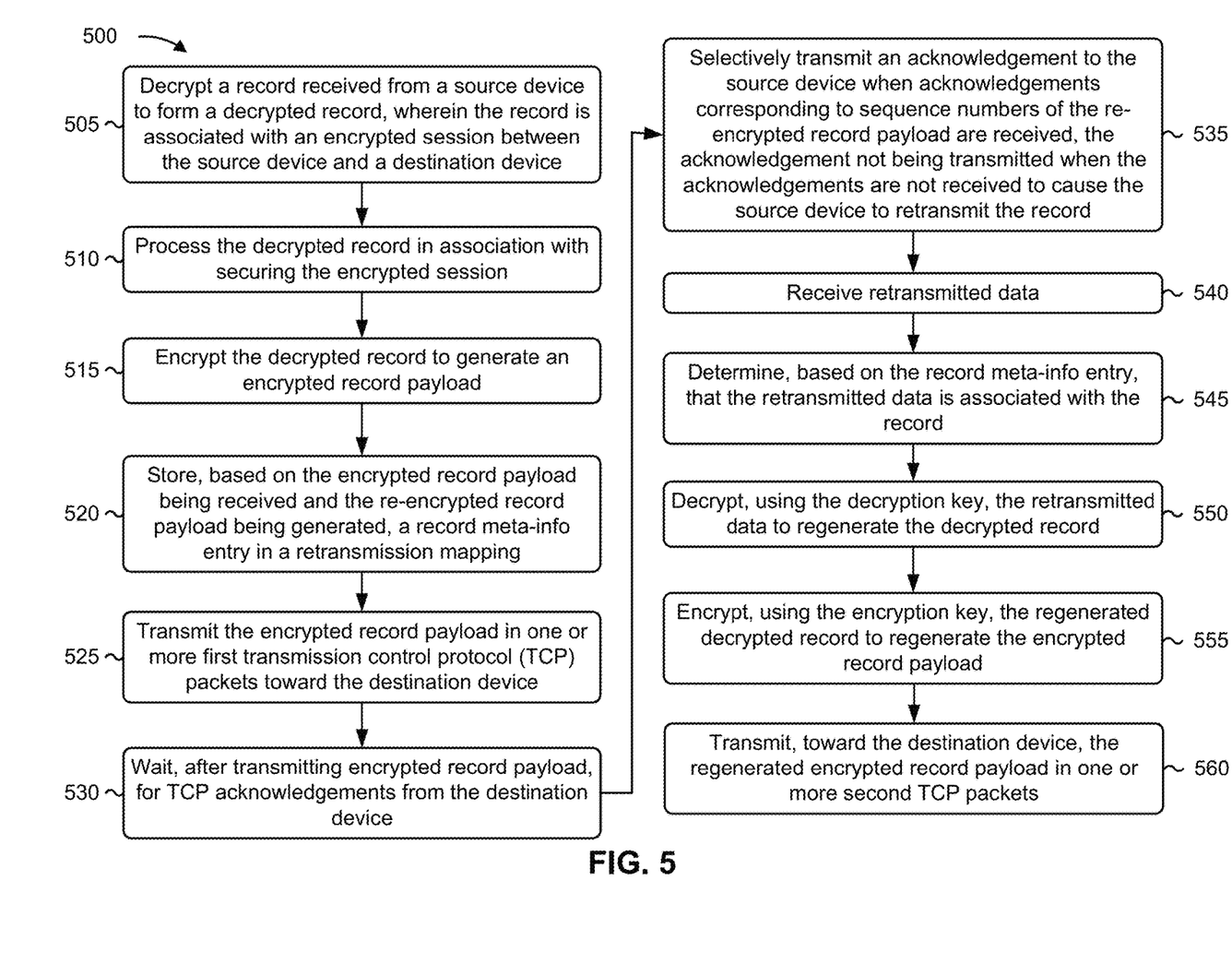
FIG. 5 is a flow chart of an example process relating to adaptive control of secure sockets layer proxy.

FIG. 5 is a flowchart of an example process 500 associated with adaptive control of secure sockets layer proxy. In some implementations, one or more process blocks of FIG. 5 may be performed by a network device (e.g., network device 230). In some implementations, one or more process blocks of FIG. 5 may be performed by another device or a group of devices separate from or including the network device, such as client device 210, server device 220, and/or the like. Additionally, or alternatively, one or more process blocks of FIG. 5 may be performed by one or more components of a device 300, such as processor 320, memory 330, storage component 340, input component 350, output component 360, communication component 370, and/or the like.

As shown in FIG. 5, process 500 may include decrypting a record received from a source device to form a decrypted record, wherein the record is associated with an encrypted session between the source device and a destination device (block 505). For example, the network device may decrypt a record received from a source device to form a decrypted record, as described above. In some implementations, the record is associated with an encrypted session between the source device and a destination device. The encrypted session may be secure via a decryption key, an encryption key, and a TLS/SSL protocol. The record may be application data associated with an application platform hosted by the destination device.

In some implementations, prior to decrypting the record, the network device receives a set of TCP data segments that are associated with a TLS/SSL record. The TLS/SSL record may include a header followed by data which may be encrypted. The TLS/SSL record header may include information (e.g., a field) indicating a length of the record and a TCP header may include a starting sequence number for the TCP segment containing the TLS/SSL record header which can be used to determine a sequence identifier associated with the start of the TLS/SSL record. The network device may determine an ending sequence identifier based on the starting sequence identifier and the length of the record. Based on the ending sequence identifier, the network device may determine a range of sequence identifiers associated with the record. The network device may determine that the record has been received based on the range of sequence identifiers.

In some implementations, the source device is a client device and the destination device is a server device of an application platform, the encrypted session is an application session between the client device and the application platform, and the record is application data of the application session or control data related to the TLS/SSL session itself.

As further shown in FIG. 5, process 500 may include processing the decrypted record in association with securing the encrypted session (block 510). For example, the network device may process the decrypted record in association with securing the encrypted session, as described above.

As further shown in FIG. 5, process 500 may include encrypting the decrypted record to generate an encrypted record payload (block 515). For example, the network device may encrypt the decrypted record to generate an encrypted record payload, as described above. In some implementations, a length of the encrypted record payload is different from a length of the encrypted record that was received by the network device. In some implementations, a received encrypted payload might be sent as one or more re-encrypted payloads based on a record size negotiated during a process for establishing the encrypted connection.

As further shown in FIG. 5, process 500 may include storing, based on the encrypted record payload received and the re-encrypted record payload being generated, a record meta-info entry in a retransmission mapping (block 520). For example, the network device may store, based on the encrypted record payload being generated, a record meta-info entry in a retransmission mapping, as described above. In some implementations, the record meta-info entry includes a decryption key used to decrypt the record and an encryption key used to encrypt the decrypted record. Alternatively, and/or additionally, the record meta-info entry includes information associated with the received encrypted record payload, such as a record length, a record identifier, a record sequence number, TCP sequence numbers corresponding to the TLS/SSL record, cryptographic key information relevant to decrypting the encrypted record payload, a checksum of the decrypted record payload, and/or the like. The record meta-info entry may include information associated with the re-encrypted record payload, such as a record length, a record identifier, a record sequence number, TCP sequence numbers corresponding to the TLS/SSL record, cryptographic key information relevant to encrypting the decrypted record payload, and/or the like.

In some implementations, the decryption key and the encryption key are associated with a TLS/SSL protocol. In some implementations, the encryption key is different from the decryption key. In some implementations, the record meta-info entry may be generated based on the record previously being processed by the network device.

As further shown in FIG. 5, process 500 may include transmitting the encrypted record payload in one or more first transmission control protocol (TCP) packets toward the destination device (block 525). For example, the network device may transmit the encrypted record payload in one or more first transmission control protocol (TCP) packets toward the destination device, as described above.

As further shown in FIG. 5, process 500 may include waiting, after transmitting the encrypted record payload, for TCP acknowledgements from the destination device (block 530). For example, the network device may wait, after transmitting the encrypted record payload, for TCP acknowledgements from the destination device, as described above.

As further shown in FIG. 5, process 500 may include selectively transmitting an acknowledgement to the source device when acknowledgements corresponding to sequence numbers of the re-encrypted record payload are received, the acknowledgement not being transmitted when the acknowledgements are not received to cause the source device to retransmit the record (block 535). For example, the network device may selectively transmit an acknowledgement to the source device when acknowledgements corresponding to sequence numbers of the re-encrypted record payload are received, the acknowledgement not being transmitted when the acknowledgements are not received to cause the source device to retransmit the record, as described above. In some implementations, the network device may transmit the acknowledgement when acknowledgements corresponding to the complete record are received. In TCP header readjustment mode the network device transmits an acknowledgement when acknowledgements corresponding to the complete record are received.

In some implementations, the network device may transmit a partial acknowledgement indicating that a portion of the record has been received based on receiving acknowledgements corresponding to the portion of the record. For example, in some instances, the network device may receive duplicate acknowledgements. The network device may transition, based on receiving the duplicate acknowledgements, to a TCP end point mode to participate in TCP congestion control. The network device may send a series of partial acknowledgements to facilitate a faster retransmission of the entire record.

As further shown in FIG. 5, process 500 may include receiving retransmitted data (block 540). For example, the network device may receive retransmitted data, as described above.

As further shown in FIG. 5, process 500 may include determining, based on the record meta-info entry, that the retransmitted data is associated with the record (block 545). For example, the network device may determine, based on the record meta-info entry, that the retransmitted data is associated with the record, as described above. In some implementations, the retransmitted data is determined to be associated with the record based on the retransmitted data including one or more of the sequence identifiers that are identified in the record meta-info entry.

The record in the retransmitted data may include a header followed by data which may be encrypted. The TLS/SSL record header may include information (e.g., a field) indicating a length of the record and a TCP header may include a starting sequence number for the TCP segment containing the TLS/SSL record header which can be used to determine a sequence identifier associated with the start of the TLS/SSL record. The network device may determine an ending sequence identifier based on the starting sequence identifier and the length of the record. Based on the ending sequence identifier, the network device may determine a range of sequence identifiers associated with the record. The network device may determine that the record has been received based on the range of sequence identifiers. In some implementations, the record meta-info entry includes a sequence range of TCP data segments of the record and the retransmitted data is determined to be associated with the record based on the retransmitted data indicating one or more sequence identifiers of the sequence range that is identified in the record meta-info entry.

As further shown in FIG. 5, process 500 may include decrypting, using the decryption key, the retransmitted data to regenerate the decrypted record (block 540). For example, the network device may decrypt, using the decryption key, the retransmitted data to regenerate the decrypted record, as described above. In some implementations, the network device may bypass inspection of the regenerated decrypted record in association with securing the encrypted session based on the retransmitted data being associated with the record and the decrypted record being previously processed in association with securing the encrypted session. For example, the regenerated encrypted record payload may be transmitted without the regenerated decrypted record being processed in association with securing the encrypted session.

In some implementations, the retransmitted data corresponds to a set of TCP data segments that are associated with a sequence range of the record and prior to decrypting the retransmitted data, the network device validates that the record was retransmitted based on the sequence range being identified in the record meta-info entry.

As further shown in FIG. 5, process 500 may include re-encrypting, using the encryption key, the regenerated decrypted record to regenerate the encrypted record payload (block 545). For example, the network device may re-encrypt, using the encryption key, the regenerated decrypted record to regenerate the encrypted record payload, as described above.

As further shown in FIG. 5, process 500 may include transmitting, toward the destination device, the regenerated encrypted record payload in one or more second TCP packets (block 550). For example, the network device may transmit, toward the destination device, the regenerated encrypted record payload in one or more second TCP packets, as described above.

In some implementations, the network device determines that a performance metric of a network associated with the network device does not satisfy a performance threshold; transitions to a TCP end point mode based on the performance metric not satisfying the performance threshold. The network device may store, in the retransmission queue of a TCP connection associated with the encrypted record payload and based on transitioning to the TCP end point mode, the regenerated encrypted record payload. The network device may transmit the regenerated encrypted record payload toward the destination device. The network device may obtain, from the retransmission queue, the regenerated encrypted record payload based on determining that an acknowledgement associated with the regenerated encrypted record payload has not been received. The network device may retransmit the regenerated encrypted record, obtained from the retransmission queue, toward the destination device based on the acknowledgement not being received. The network device may determine that the performance metric satisfies the performance threshold. The network device may determine that data received after the network device transitions to the TCP end point mode has been transmitted by the network device and that acknowledgements associated with the data have been received by the network device. The network device may transition from the TCP end point mode to a header re-adjustment mode based on the performance metric satisfying the performance threshold, the data having been transmitted by the network device, and the acknowledgements having been received by the network device.

In some implementations, the record is a first record and the encrypted record payload is a first encrypted record payload and the network device determines, based on receiving the retransmitted data, that a performance metric of a network associated with the network device does not satisfy a performance threshold. The network device may transition from a header re-adjustment mode to a TCP end point mode based on determining that the performance metric does not satisfy the performance threshold. The network device may receive a second record. The network device may store, in the retransmission queue of a TCP connection associated with the second record and based on transitioning to the TCP end point mode, a second encrypted record payload that was generated based on a decryption of the second record. The network device may transmit the second encrypted record payload towards a destination associated with the second record. The network device may determine that the performance metric satisfies the performance threshold. The network device may determine that data received after the network device transitions to the TCP end point mode has been transmitted by the network device and that acknowledgements associated with the data have been received by the network device. The network device may transition from the TCP end point mode to the header re-adjustment mode based on the performance metric satisfying the performance threshold, the data having been transmitted by the network device, and the acknowledgements having been received by the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    decrypting, by a network device, a record received from a source device to form a decrypted record, wherein the record is associated with an encrypted session between the source device and a destination device;
    processing, by the network device, the decrypted record in association with securing the encrypted session;
    encrypting, by the network device, the decrypted record to generate an encrypted record payload;
    storing, by the network device and based on the encrypted record payload being generated, a record entry in a retransmission mapping, wherein the record entry includes a decryption key used to decrypt the record and an encryption key used to encrypt the decrypted record;
    transmitting, by the network device, the encrypted record payload in one or more first transmission control protocol (TCP) packets toward the destination device;
    receiving, by the network device, retransmitted data;
    determining, by the network device and based on the record entry, that the retransmitted data is associated with the record;
    decrypting, by the network device and using the decryption key, the retransmitted data to regenerate the decrypted record;
    re-encrypting, by the network device and using the encryption key, the regenerated decrypted record to regenerate the encrypted record payload; and
    transmitting, by the network device and toward the destination device, the regenerated encrypted record payload in one or more second TCP packets.

2. The method of claim 1, wherein a length of the encrypted record payload is different from a length of record payload of the received record, and
    wherein a TCP sequence and acknowledgement numbers in a TCP header associated with the record are adjusted to account for the length of the encrypted record payload being different from the length of the record payload of the received record.

3. The method of claim 1, wherein the decryption key and the encryption key are associated with a transport layer security protocol.

4. The method of claim 1, wherein the source device is a client device and the destination device is a server device of an application platform,
    wherein the encrypted session is an application session between the client device and the application platform, and
    wherein the record is application data of the application session or control data related to the encrypted session.

5. The method of claim 1, further comprising:
    prior to decrypting the record:
        receiving a set of TCP data segments that are associated with a sequence range of the record; and
        determining that the record has been received based on sequence identifiers of the sequence range being identified in the set of TCP data segments,
            wherein the record is decrypted based on determining that the record has been received.

6. The method of claim 5, further comprising:
    receiving one or more acknowledgements associated with the encrypted record payload;
    determining that the one or more acknowledgments correspond to an entire portion of the encrypted record payload;
    adjusting one or more sequence numbers identified in the one or more acknowledgements based on the sequence identifiers of the sequence range associated with the record received from the source device; and
    transmitting the one or more acknowledgements to the source device based on adjusting the one or more sequence numbers.

7. The method of claim 5, wherein the retransmitted data is determined to be associated with the record based on a transmission control protocol (TCP) sequence number in a TCP header associated with the retransmitted data.

8. The method of claim 1, wherein the network device transitions a first session from a TCP header re-adjustment mode to a TCP end point mode or maintains a second session in the TCP end point mode based on one or more of:
    a published receiver window being less than a size of the record, a sender congestion window being less than the size of the record, or an occurrence of a time out prior to an entire portion of the record being received; and wherein the network device transitions the first session and the second session to the TCP header re-adjustment mode based on one or more of:

the published receiver window being greater than a size of the record, the sender congestion window being greater than the size of the record, or receiving one or more acknowledgements indicating that the entire portion of the record has been received.

9. The method of claim 1, wherein the network device transitions a session from a TCP header re-adjustment mode to a TCP end point mode based on determining a loss of a TCP packet containing the re-encrypted record based on receiving duplicate TCP acknowledgements, and wherein the network device transitions the session to the TCP end point mode to participate in TCP congestion avoidance and to prevent an occurrence of a retransmission time out associated with the source device, the method further comprising:

transmitting duplicate first acknowledgements to the source device to indicate that a first segment of the record is lost;

transmitting, based on receiving a retransmission of the first segment, duplicate second acknowledgements to the source device to indicate that a second segment of the record is lost;

determining that an entire portion of the record has been retransmitted by the source device; and transitioning from the TCP end point mode to the TCP header re-adjustment mode based on the entire portion of the record having been retransmitted.

10. A network device, comprising:

one or more memories; and one or more processors to:

receive a record of an encrypted session between a source device and a destination device;

store, in a retransmission mapping, a record entry associated with processing the record in association with the encrypted session and transmitting an encrypted record payload associated with the record, wherein the record entry includes a decryption key to be used to decrypt the record for an inspection and an encryption key to be used to encrypt the decrypted record to generate the encrypted record payload;

transmit the encrypted record payload in one or more first transmission control protocol (TCP) packets toward the destination device;

receive retransmitted data;

determine, based on the record entry, that the retransmitted data is associated with the record;

decrypt, using the decryption key, the retransmitted data to regenerate the decrypted record;

re-encrypt, using the encryption key, the regenerated decrypted record to regenerate the encrypted record payload; and transmit, toward the destination device, the regenerated encrypted record payload in one or more TCP data segments.

11. The network device of claim 10, wherein the record is one or more of: application data associated with an application platform hosted by the destination device; or control data for a transport layer security session.

12. The network device of claim 10, wherein the record entry includes a sequence range of TCP data segments of the record, and wherein the retransmitted data is determined to be associated with the record based on a transmission control protocol (TCP) sequence number in a TCP header associated with the retransmitted data.

13. The network device of claim 10, wherein the regenerated encrypted record payload is to be transmitted without the regenerated decrypted record being processed in association with securing the encrypted session.

14. The network device of claim 10, wherein the retransmitted data corresponds to a set of TCP data segments that are associated with a sequence range of the record, and wherein the one or more processors are further to:

prior to decrypting the retransmitted data, validate that the record was retransmitted based on a hash or a checksum computed based on the retransmitted data.

15. A non-transitory computer-readable medium storing a set of instructions, the set of instructions comprising:

one or more instructions that, when executed by one or more processors of a network device, cause the network device to:

receive retransmitted data associated with a record that was previously processed using a decryption key and an encryption key in association with an encrypted session that uses transport layer security protocol;

access a retransmission mapping to identify a record entry associated with the record being previously processed;

determine, based on the record entry, that the retransmitted data is associated with the record;

decrypt, using the decryption key, the retransmitted data to regenerate a decrypted record that was previously generated when the record was previously processed;

re-encrypt, using the encryption key, the regenerated decrypted record to regenerate an encrypted record payload that was previously generated when the record was previously processed; and transmit, toward a destination device, the regenerated encrypted record payload in one or more transmission control protocol (TCP) packets.

16. The non-transitory computer-readable medium of claim 15, wherein the record entry was generated based on the record previously being processed by the network device.

17. The non-transitory computer-readable medium of claim 15, wherein the decryption key and the encryption key are different and a length of the encrypted record payload is different from a length of the record, and wherein a received encrypted payload is transmitted as one or more re-encrypted payloads based on a record size negotiated during an establishment of an encrypted connection associated with the received encrypted payload.

18. The non-transitory computer-readable medium of claim 15, wherein the regenerated encrypted record payload is transmitted without the regenerated decrypted record being processed in association with securing the encrypted session.

19. The non-transitory computer-readable medium of claim 15, wherein the retransmitted data is first retransmitted data, and wherein the one or more instructions further cause the network device to:

determine that a performance metric of a network associated with the network device does not satisfy a performance threshold;
transition to a TCP end point mode based on the performance metric not satisfying the performance threshold;
store, in the retransmission queue of a TCP connection associated with the encrypted record payload and based on transitioning to the TCP end point mode, the regenerated encrypted record payload;
transmit the regenerated encrypted record payload toward the destination device;
obtain, from the retransmission queue, the regenerated encrypted record payload based on determining that an acknowledgement associated with the regenerated encrypted record payload has not been received;
retransmit the regenerated encrypted record, obtained from the retransmission queue, toward the destination device based on the acknowledgement not being received;
determine that the performance metric satisfies the performance threshold;
determine that data received after the network device transitions to the TCP end point mode has been transmitted by the network device and that acknowledgements associated with the data have been received by the network device; and
transition from the TCP end point mode to a header re-adjustment mode based on the performance metric satisfying the performance threshold, the data having been transmitted by the network device, and the acknowledgements having been received by the network device.

20. The non-transitory computer-readable medium of claim 15, wherein the one or more instructions further cause the network device to:
receive duplicate acknowledgements associated with transmitting the regenerated encrypted record payload in the one or more TCP packets;
transition to a TCP end point mode based on receiving the duplicate acknowledgements; and
transmit a series of partial acknowledgements to a device from which the retransmitted data was received based on transitioning to the TCP end point mode.

\* \* \* \* \*